(12) United States Patent
Schultz

(10) Patent No.: US 6,594,602 B1
(45) Date of Patent: Jul. 15, 2003

(54) METHODS OF CALIBRATING PRESSURE AND TEMPERATURE TRANSDUCERS AND ASSOCIATED APPARATUS

(75) Inventor: Roger Lynn Schultz, Aubrey, TX (US)

(73) Assignee: Halliburton Energy Services, Inc., Dallas, TX (US)

( * ) Notice: Subject to any disclaimer, the term of this patent is extended or adjusted under 35 U.S.C. 154(b) by 0 days.

(21) Appl. No.: 09/298,691

(22) Filed: Apr. 23, 1999

(51) Int. Cl.[7] .......................... G01F 25/00; G06F 19/00
(52) U.S. Cl. .......................................... 702/104; 702/85
(58) Field of Search .......................... 702/79, 106, 179, 702/104, 93, 85; 706/44

(56) References Cited

U.S. PATENT DOCUMENTS

| | | |
|---|---|---|
| 4,730,281 A | 3/1988 | Rodney et al. |
| 5,233,866 A | 8/1993 | Desbrandes |
| 5,272,680 A | 12/1993 | Stone et al. |
| 5,554,273 A * | 9/1996 | Demmin et al. ............ 205/785 |
| 5,617,337 A * | 4/1997 | Eidler et al. ............ 364/551.01 |
| 5,642,301 A * | 6/1997 | Warrior et al. ......... 364/571.02 |
| 5,803,186 A | 9/1998 | Berger et al. |
| 5,828,981 A * | 10/1998 | Callender et al. ............... 702/6 |
| 5,862,513 A * | 1/1999 | Mezzatesta et al. ............ 702/9 |
| 5,995,910 A * | 11/1999 | Discenzo ..................... 702/56 |
| 6,002,985 A * | 12/1999 | Stephenson ................... 702/13 |
| 6,128,585 A * | 10/2000 | Greer ......................... 702/104 |
| 6,236,908 B1 * | 5/2001 | Cheng et al. .................. 701/1 |
| 6,282,452 B1 * | 8/2001 | DeGuzman et al. .......... 700/32 |

FOREIGN PATENT DOCUMENTS

| | | |
|---|---|---|
| WO | WO96/42058 | 12/1996 |
| WO | WO98/03852 | 1/1998 |
| WO | WO98/55836 | 12/1998 |

OTHER PUBLICATIONS

European Search Report Application No. EP 00 30 2899.
Society of Petroleum Engineers Paper SPE52167, dated Mar. 28, 1999.

* cited by examiner

*Primary Examiner*—Marc S. Hoff
*Assistant Examiner*—Paul Kim
(74) *Attorney, Agent, or Firm*—Marlin R. Smith

(57) ABSTRACT

A calibration method provides enhanced accuracy in calibrating outputs of sensors. In embodiments described herein, the outputs of one or more sensors are input to a neural network and the neural network is trained to generate calibrated outputs in response thereto. In one method, the neural network is trained to simulate the output of a known accurate reference sensor in response to input to the neural network of the output of a subject sensor. In another method, the neural network is trained to simulate the output of a known accurate reference sensor in response to input to the neural network of the output of a subject sensor and the output of a second sensor. Additional methods are provided which compensate for changes in a stimulus applied to a sensor, the output which is indicative of another stimulus.

43 Claims, 7 Drawing Sheets

FIG.6

METHODS OF CALIBRATING PRESSURE AND TEMPERATURE TRANSDUCERS AND ASSOCIATED APPARATUS

BACKGROUND OF THE INVENTION

The present invention relates generally to methods utilized to calibrate sensors and, in an embodiment described herein, more particularly provides a method for calibrating pressure and temperature transducers utilized in tools in subterranean wells.

It is common practice to use transducers in downhole tools for various purposes. For example, in a drill stem test or other well test, important information regarding the present and future productivity of a well may be determined by evaluating pressure, temperature, flow rate, etc. data recorded during the test. Unfortunately, the accuracy of that information is necessarily dependent upon the accuracy of the recorded data from which it is derived.

Typically, the pressure, temperature, flow rate, etc. data is acquired from outputs of transducers or other sensor apparatus positioned downhole during the test. In this manner, the sensors are positioned in relatively close proximity to a particular formation or zone being evaluated in the test, thereby minimizing the contribution of wellbore storage effects, resistance to flow, temperature changes, etc. to the collected data. However, such downhole positioning of the sensors creates other problems which affect the accuracy of the sensor outputs.

Quartz piezoelectric pressure transducers are generally used in well tests, due to their superior accuracy as compared to other types of commercially available pressure transducers. When a conventional quartz pressure transducer is positioned downhole, however, it is subjected to whatever static or dynamic temperature conditions exist in the downhole environment. Since the output of a conventional quartz pressure transducer is affected by the temperature of the piezoelectric sensor therein, the precise manner in which the transducer output is affected by temperature must be known, and the output of the transducer must be appropriately corrected for the temperature at which the output data was taken, in order to increase the accuracy of the data.

In a similar manner, quartz piezoelectric temperature transducers may be affected by pressure applied thereto. Thus, if a quartz temperature transducer is subjected to pressures existing downhole during a well test, the accuracy of the acquired temperature data is affected. Fortunately, such inaccuracies in the temperature data are generally considered to be relatively minor, and so the temperature data is commonly used to correct the pressure data acquired by the pressure transducer. Nevertheless, it may be seen that the inaccuracies are compounded by using inaccurate temperature data to correct inaccurate pressure data.

Again, in a similar manner, flow rate data collected from the output of a flow rate sensor is typically affected by conditions existing downhole. For example, since the output of a common flow rate sensor is typically influenced by the temperature of the fluid for which the flow rate is being sensed, the flow rate sensor output data must be corrected for the temperature of the fluid at the time the output is generated. Such influence of fluid temperature on flow rate sensor output usually affects the accuracy of the acquired data greatest when the fluid is a gas, or a liquid with gas entrained therein.

Sensors used in downhole environments may be affected by other factors as well. For example, the output of a quartz piezoelectric pressure sensor is not only affected by the temperature of the surrounding environment, it is also affected by changes in the temperature of the surrounding environment, such as the rate of temperature change. This is due to the fact that the pressure sensor is sensitive to stresses in a quartz crystal thereof and stresses are induced in the quartz crystal in response to changes in the temperature of the crystal.

In the past, a quartz pressure transducer was statically calibrated by placing the transducer in a fluid bath at a known constant temperature and recording the output of the transducer at various pressures applied thereto. In this manner, a sensor output profile at that temperature was obtained. This procedure was then repeated at different temperatures, with a sensor output profile being generated for each temperature. Thus, a set of sensor output profiles was generated, each profile corresponding to a different temperature.

When the output of a particular pressure transducer was evaluated in actual practice, for example, after a well test, the output would be corrected based on the temperature of the surrounding environment at the time the output data was acquired. However, since the temperature of the surrounding environment typically fell between two of the temperatures used in the procedure to generate the sensor output profiles, it was generally necessary to interpolate between the corresponding sensor output profiles. Such interpolation usually assumed that a linear relationship existed between the output profiles and the corresponding temperatures at which they were generated and, since this linear relationship is generally not the case, this introduced further inaccuracies into the resulting corrected output data. Additionally, this method did not compensate at all for changes in temperature at the time the sensor output data was acquired.

Therefore, from the foregoing, it is apparent that a need exists for improved methods of calibrating sensors and, in particular, a need exists for utilizing such improved methods for calibrating sensors used in downhole environments. Furthermore, it would be desirable to provide such methods which compensate for changes in the environments in which the sensors are operated.

SUMMARY OF THE INVENTION

In carrying out the principles of the present invention, in accordance with described embodiments thereof, methods are provided which enable sensors to be calibrated with enhanced accuracy. The methods may be particularly useful for sensors utilized in applications where environmental conditions change during use of the sensors, such as in downhole transducer applications. Associated apparatus are also provided.

In one aspect of the present invention, a subject sensor which generates an output indicative of a stimulus is subjected to multiple levels of the stimulus. For example, a pressure sensor may be subjected to multiple fluid pressure levels. The output of the subject sensor is determined at each of the stimulus levels. A known accurate reference sensor is also subjected to the multiple stimulus levels and its output determined at each of the stimulus levels. The output of the subject sensor for the applied stimulus levels is then input to a neural network. The neural network is trained so that, when an output of the subject sensor is input to the neural network, the neural network simulates an output of the reference sensor.

In this manner, an output of the known accurate reference sensor is simulated in response to an input to the neural network of an output of the subject sensor. This method may be particularly useful in applications where the subject sensor is exposed only to changes in the stimulus level, or where the output of the subject sensor is not influenced by other stimulus levels. For example, where the subject sensor is a pressure sensor either not exposed to, or unaffected by, changes in temperature.

In another aspect of the present invention, the neural network has input to it multiple levels of a second stimulus which affects the output of the subject sensor. For example, where the subject sensor is a pressure sensor, the output of which is influenced by the temperature of the sensor. During training of the neural network, known levels of the second stimulus, such as in the form of output of a second known accurate reference sensor, at each of the outputs of the subject sensor are input to the neural network. Thereafter, the calibrated neural network output will compensate for the influence of the second stimulus level in simulating an output of the known accurate reference sensor in response to an input to the neural network of an output of the subject sensor and the second stimulus level.

In still another aspect of the present invention, a method of calibrating a subject sensor is provided in which outputs of both the subject sensor and a second sensor are input to a neural network. In this case, the subject sensor generates an output indicative of a first stimulus and the second sensor generates an output indicative of a second stimulus. The output of the subject sensor in response to each of multiple levels of the first stimulus is determined, with the subject sensor also being subjected to one of multiple levels of the second stimulus at each of the first stimulus levels. The output of the second sensor is determined in response to the level of the second stimulus at each of the first stimulus levels. A first known accurate reference sensor is also subjected to the first stimulus levels and its output determined at each of these. A second known accurate reference sensor is also subjected to the second stimulus levels and its output determined at each of these. The subject sensor outputs and the second sensor outputs are then input to a neural network and, using this data, the neural network is trained to simulate outputs of the reference sensors in response to input to the neural network of outputs of the subject and second sensors.

In this manner, an output of the first reference sensor is simulated in response to input to the neural network of outputs of the subject and second sensors. This method may be particularly useful in applications in which the subject sensor output is influenced by the stimulus indicated by the second sensor. For example, in applications where the subject sensor is a pressure sensor whose output is influenced by temperature, which property is indicated by the second sensor.

In yet another aspect of the present invention, a method of calibrating a subject sensor is provided in which the subject sensor generates an output indicative of a first stimulus, but the output is influenced at least transiently by a rate of change of a second stimulus. A second sensor is utilized in the method, the sensor generating an output indicative of the second stimulus. The subject and second sensors are subjected to known levels of the first and second stimuli at known discrete time intervals, and the outputs of the sensors at these stimulus levels are recorded. The subject and second sensor outputs, and the time intervals are then input to a neural network and the neural network is trained to generate an output which is a known mathematical function of the first stimulus in response to input to the neural network of outputs of the subject and second sensors at associated time intervals.

In this manner, a subject sensor, which has an output indicative of a first stimulus, but influenced at least in part by changes in a second stimulus, may be calibrated using a second sensor which has an output indicative of the second stimulus, with the outputs of the subject and second sensors being taken at known time intervals. This method may, for example, be useful where the subject sensor is a pressure sensor whose output is influenced by a rate of change in temperature of the surrounding environment.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1:
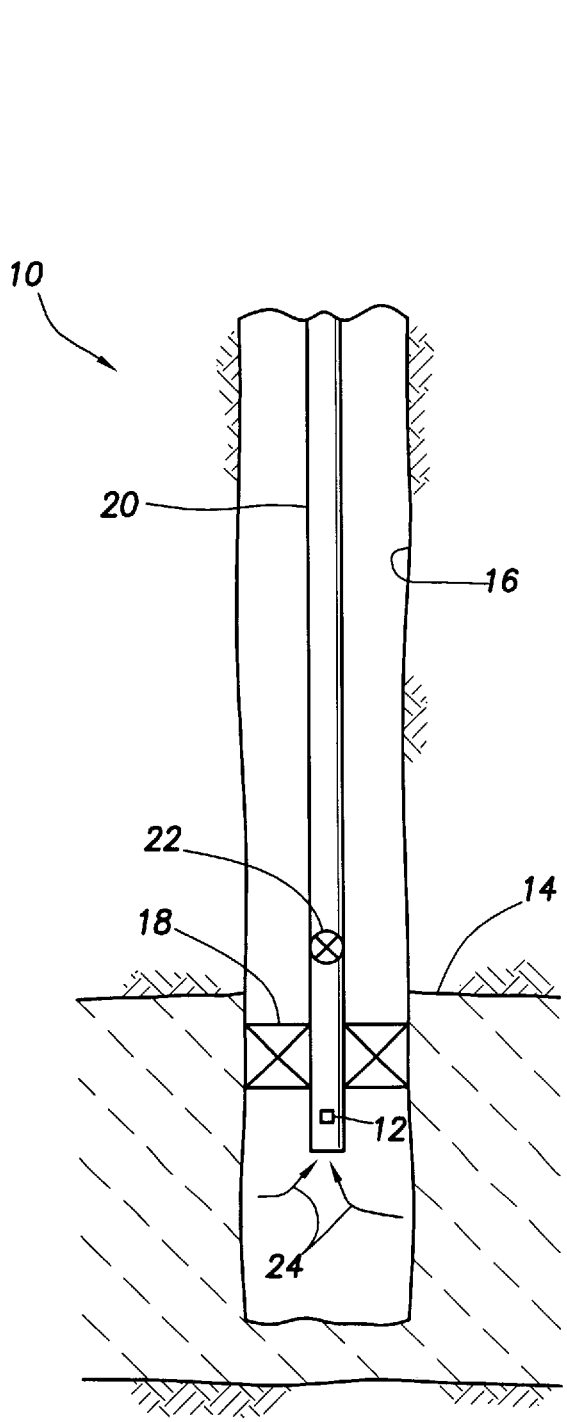
FIG. 1 is a schematic view of a well testing method which may embody principles of the present invention.

Representatively illustrated in FIG. 1 is a method 10 which may embody principles of the present invention. In the following description of the method 10 and other apparatus and methods described herein, directional terms, such as "above", "below", "upper", "lower", etc., are used for convenience in referring to the accompanying drawings. Additionally, it is to be understood that the various embodiments of the present invention described herein may be utilized in various orientations, such as inclined, inverted, horizontal, vertical, etc., without departing from the principles of the present invention.

The method 10 is representatively illustrated in FIG. 1 as comprising a type of well test known as a drill stem test, wherein a transducer 12 is utilized to determine the temperature and pressure in close proximity to a formation or zone of interest 14 intersected by a wellbore 16. However, it is to be clearly understood that principles of the present invention may be incorporated into many methods other than those described herein. For example, the wellbore 16 may be cased instead of open or uncased as depicted in FIG. 1, it is not necessary for methods incorporating principles of the present invention to comprise drill stem tests or other types of well tests, the transducer 12 may be otherwise positioned, multiple transducers may be utilized, etc. Thus, it will be readily appreciated that the principles of the present invention are not limited to the specific embodiments of the method 10 described herein.

In one type of conventional drill stem test, the zone 14 is isolated from the remainder of the well, such as by setting one or more packers 18 in the wellbore 16, the packer being conveyed into the wellbore as a part of a tubular string 20. The string 20 also includes a valve 22 for selectively permitting and preventing fluid flow through the string. When the valve 22 is opened, fluid (indicated by arrows 24) is permitted to flow into the string 20 and, e.g., to the earth's surface. When the valve 22 is closed, the fluid 24 is not permitted to flow through the string 20, but is contained in the string below the valve and in the wellbore 16 below the packer 18.

It is common practice in drill stem tests to perform tests known as drawdown and buildup tests when it is desired to evaluate the potential productivity of a zone, such as zone 14. A transducer, such as transducer 12, is used to determine the pressure and temperature downhole during these tests. This data may then be evaluated prior to making important decisions, such as whether to expend the capital necessary to put the zone into production. Thus, the accuracy of the data procured during the tests may very well make the difference between making a correct decision and making an incorrect decision regarding the zone 14, or regarding the entire well.

In the method 10, the transducer 12 has been accurately calibrated using one of the calibration methods described more fully below. Such calibration ensures that the data procured by the transducer 12 is more accurate than that available with previous methods, and gives those persons making decisions regarding the zone 14 and the remainder of the well increased confidence in the correctness of those decisions.

Figure 2:
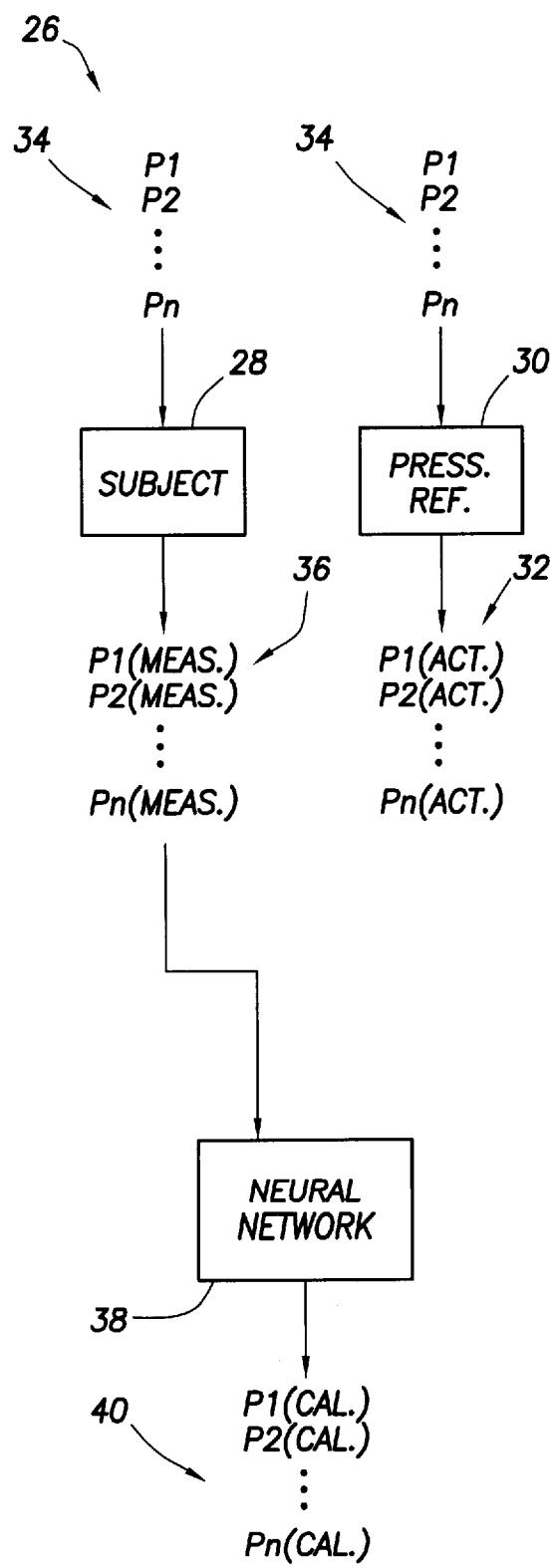
FIG. 2 is a schematic flow chart of a first method of calibrating sensors, the method embodying principles of the present invention.

Referring additionally now to FIG. 2, a method 26 of calibrating a sensor 28 is schematically and representatively illustrated in flow chart form. The subject sensor 28 may be incorporated into the transducer 12 of the method 10, or it may be utilized in other methods, other transducers, other applications, etc., without departing from the principles of the present invention. Additionally, the subject sensor 28 is described herein as being a pressure sensor, i.e., a sensor which produces an output indicative of pressure applied thereto. However, it is to be clearly understood that the subject sensor 28 may be any type of sensor and may produce an output indicative of one or more stimuli other than pressure in keeping with the principles of the present invention. As used herein, the term "stimulus" is used to describe any stimulus which may be sensed or detected by a sensor, for example, temperature, pressure, pH, salinity, acceleration, speed, displacement, wavelength, fluid flow rate, density, weight, etc.

In the method 26, a reference sensor 30 is used in the initial calibration of the subject sensor 28. In the illustrated situation in which the subject sensor 28 is a pressure sensor, the reference sensor 30 is also a pressure sensor. Of course, if the subject sensor 28 is a temperature sensor in actual practice, the reference sensor 30 would also be a temperature sensor.

The reference sensor 30 generates an output 32 of known accuracy, that is, its output has a known mathematical relationship to pressures 34 applied thereto, whether the output takes the form of a frequency, a voltage, a current, combinations thereof, other forms, etc. Thus, the output 32 of the reference sensor 30 is designated with the notation (act.), since it has a known relationship to the actual pressures 34 applied to the reference sensor. Of course, if the actual pressures 34 applied to the subject sensor 28 can be known by other means, then use of the reference sensor 30 is unnecessary in the method 26, and the known actual pressures 34 may be substituted for the reference sensor output 32 referred to herein.

The same pressures 34 applied to the reference sensor 30 are also applied to the subject sensor 28, which generates an output 36 in response thereto. Preferably, but not necessarily, the pressures 34 are simultaneously applied to the subject and reference sensors 28, 30 from the same pressure source. The output 36 of the subject sensor 28 is designated with the notation (meas.), since it comprises the pressures as measured or determined by the subject sensor.

Note that the input pressures 34 include multiple individual fluid pressures (P1, P2, . . . , Pn), resulting in respective multiple individual pressure indications (P1 (meas.), P2(meas.), . . . , Pn(meas.)) in the subject sensor output 36 and respective multiple individual pressure indications (P1(act.), P2(act.), . . . , Pn(act.)) in the reference sensor output 32. Preferably, but not necessarily, the input pressures 34 cover or span a range equal to or greater than the intended operating pressure range of the subject sensor 28.

The output 36 of the subject sensor 28 is then input to a neural network 38 of the type well known to those skilled in the art. The neural network 38 used in the method 26 may be a multi-layer perceptron network, i.e., a network in which sums of individually weighted inputs are output to at least one activation function (e.g., log-sigmoid, symmetric saturating linear, linear, hard limit, etc.) within each layer. However, it is to be clearly understood that other types of neural networks may be utilized in the method 26, without departing from the principles of the present invention.

Note that in the method 26, the neural network 38 is a one input, one output network. The neural network 38 is "trained" by inputting the individual pressure indications in the subject sensor output 36 to the neural network, and comparing an output 40 of the neural network to the respective individual pressure indications in the reference sensor output 32, using procedures well known to those skilled in the art (e.g., by adjusting the values of the individual weights in the neural network). When the neural network output 40 simulates the reference sensor output 32 with an acceptable degree of accuracy (i.e., the neural network output bears a known mathematical relationship to the pressures 34 input to the subject and reference sensors 28, 30) in response to input thereto of the subject sensor output 36, the neural network is trained.

When the neural network 38 is trained, the known mathematical relationship may be applied to its output 40, which was generated in response to the output 36 of the subject sensor 28, in order to determine the actual pressures 34 applied to the subject sensor. Thus, the output 40 of the neural network 38 is designated with the notation (cal.), since it results from a calibration of the subject sensor 28 produced by the neural network. Thereafter, when an unknown pressure is applied to the subject sensor 28, and the output of the subject sensor is input to the neural network 38, the neural network will generate an output to which the known mathematical function may be applied to determine accurately the pressure applied to the subject sensor. Of course, the known mathematical function may be the identity function, in which case the neural network output will have values which correspond identically quantitatively to the respective values of the pressures applied to the subject sensor 28, but this is not necessary in the method 26.

The neural network 38 may take any of a variety of forms when used in actual practice to calibrate, and thereafter produce calibrated outputs of, the subject sensor 28. During the training process, the neural network 38 may exist virtually, such as when software is used to train a representation of the neural network on a computer. The trained virtual neural network 38 may then be utilized in actual practice by inputting output of the subject sensor 28 to the computer (or another computing device into which the virtual neural network has been loaded or stored), the computer in response then generating a calibrated output. Alternatively, the neural network 38 may exist as an electronic circuit or may take another form, etc.

As described above, the sensor 28 may be included in the transducer 12. The neural network 38 may also be included in the transducer 12, so that the transducer thereby generates a calibrated output in response to pressure applied thereto, or the neural network may be positioned external to the transducer, such as in another portion of the string 20 or at the earth's surface, so that the transducer output is calibrated after it leaves the transducer. Of course, it is not necessary for the neural network 38 to be directly connected to the sensor 28 or transducer 12, since any data transmission means may be used to provide communication therebetween, and since the output of the sensor or transducer may be stored for later input to the neural network. For example, a data recording device, such as nonvolatile electronic memory, may be used to record the output of the transducer 12 during the well test described above, and then retrieved later for analysis, including input of the recorded data to the neural network 38 to thereby generate a calibrated output of the transducer.

It will be readily appreciated that the method 26 described above permits a sensor to be accurately calibrated with respect to pressures or other stimulus applied thereto. However, it is sometimes the case that more than one stimulus to which a sensor is exposed affects the output of the sensor. For example, a sensor may generate an output which is indicative of a first stimulus applied to the sensor, but the output is influenced, at least in part, by a second stimulus applied to the sensor.

Figure 3:
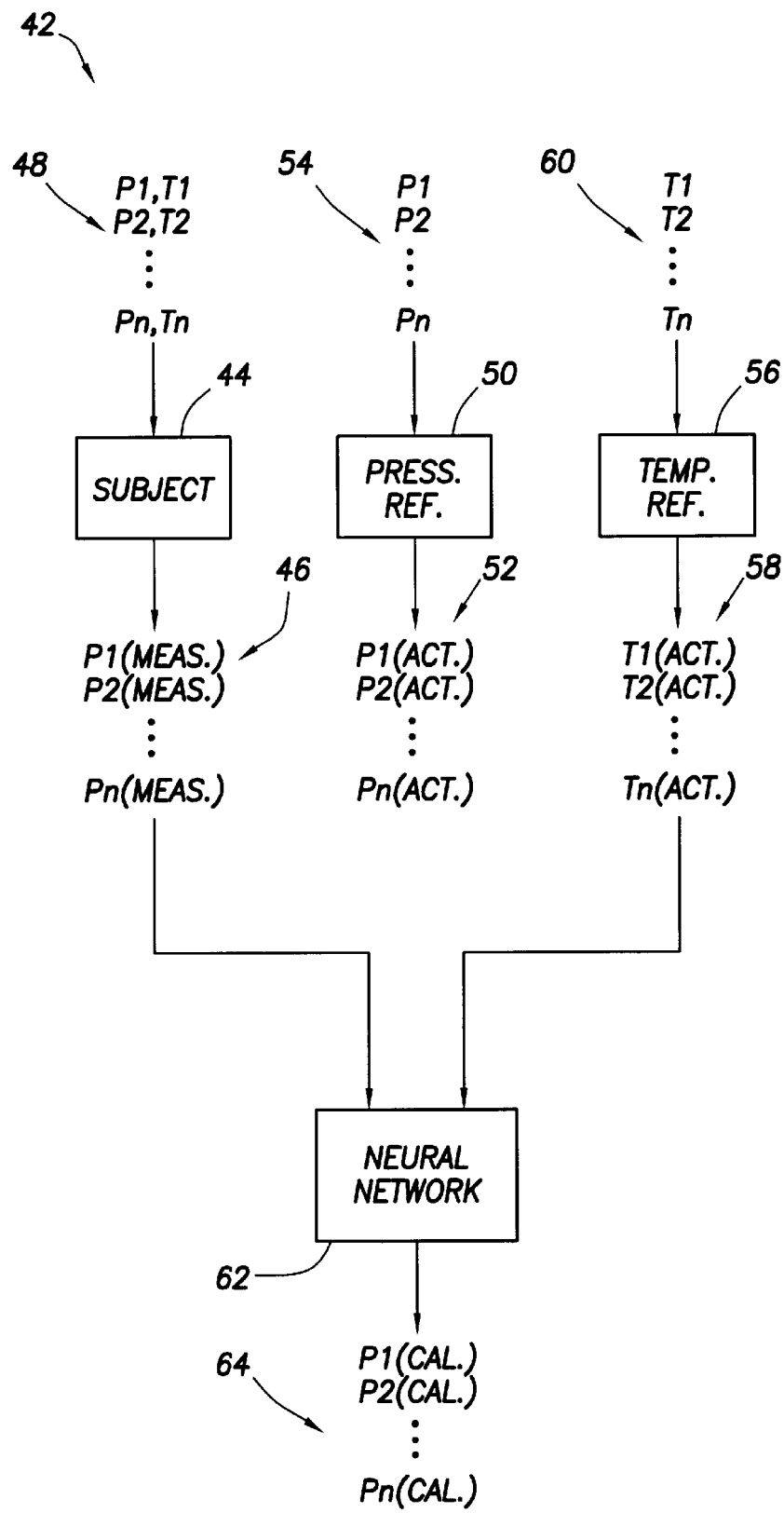
FIG. 3 is a schematic flow chart of a second method of calibrating sensors, the method embodying principles of the present invention.

Referring additionally now to FIG. 3, another method 42 of calibrating a sensor 44 is schematically and representatively illustrated in flow chart form. The subject sensor 44 may be incorporated into the transducer 12 of the method 10, or it may be utilized in other methods, other transducers, other applications, etc., without departing from the principles of the present invention. Additionally, the subject sensor 44 is described herein as being a pressure sensor, i.e., a sensor which produces an output indicative of pressure applied thereto. However, it is to be clearly understood that the subject sensor 44 may be any type of sensor and may produce an output indicative of stimuli other than pressure in keeping with the principles of the present invention.

The subject sensor 44 generates an output which is indicative of pressure applied thereto, but this output is also influenced, at least in part, by temperature applied to the sensor. This is often the case with sensors which include quartz piezoelectric crystals, and which are frequently used in downhole applications, such as in the types of well tests described above.

In the method 42, an input 48 to the subject sensor 44 includes both pressures and temperatures. Thus, for each pressure (P1, P2, . . . , Pn) applied to the subject sensor 44, a corresponding respective temperature (T1, T2, . . . , Tn) is also applied to the sensor. Preferably, but not necessarily, the pressures and temperatures in the input 48 span or cover the range of pressures and temperatures over which the subject sensor 44 is designed to operate in actual practice.

A known accurate reference pressure sensor 50 which generates an output 52 having a known mathematical relationship to an input 54 thereto including the same pressures (P1, P2, . . . , Pn) applied to the subject sensor 44 may be used in the method 42 in the same manner as the reference sensor 30 is used in the method 26 described above. Similarly, a known accurate reference temperature sensor 56 may be used in the method 42 to generate an output 58 in response to an input 60 including the same temperatures (T1, T2, . . . , Tn) applied to the subject sensor 44, with the output having a known mathematical relationship to the input. However, as described above for the reference sensor 30, if the pressures and/or temperatures in the input 48 applied to the subject sensor 44 may be otherwise known, then the pressure and/or temperature reference sensors 50, 56 are unnecessary and the actual pressure and temperature inputs 54, 60 may be substituted for the reference sensor outputs 52, 58, respectively, in the further description of the method 42 below.

The subject sensor output 46 is input to a neural network 62 in order to train the neural network. For correspondence with the individual temperatures applied to the subject sensor 44 to generate the output 46, the temperature reference sensor output 58 is also input to the neural network 62. The neural network 62 may be, but is not necessarily, of the same type as the neural network 38 described above, except that the neural network 62 is a two input, one output type of neural network. The neural network 62 is trained until its output 64 in response to input thereto of the subject sensor output 46 and the temperature reference sensor output 58 compares with sufficient accuracy to the pressure reference sensor output 52. In this manner, the neural network 62, once trained, generates a calibrated output in response to input thereto of output 46 of the subject sensor 44 and output 58 of the temperature reference sensor 56, in that the neural network output 64 simulates the output 52 of the pressure reference sensor 50.

In actual practice, output of the subject sensor 44, as well as the actual temperature applied to the subject sensor at the time its output is generated, are input to the neural network 62. The neural network 62 then generates a calibrated output which compensates for the temperature of the sensor at the time its output was generated. The subject sensor 44 and/or the neural network 62 may be included in the transducer 12 or they may be separately positioned, the neural network 62 may take any form, and the subject sensor and neural network may be directly connected or remotely communicated, as described above for the method 26.

It will be readily appreciated that the method 42 permits accurate calibration of a sensor, even though the sensor output may vary in response to a stimulus other than that stimulus for which the sensor output is primarily designed to indicate or represent. In order to generate the calibrated output of the sensor, the neural network has input thereto not only the sensor output, but also the value of the other stimulus which influences the sensor output. For example, if the subject sensor 44 is a pressure sensor and is included in the transducer 12 in the method 10 described above, the known temperature of the sensor at the time it generates its output is used by the neural network 62 to generate the calibrated output which compensates for that temperature.

However, it is sometimes difficult to determine with precision the temperature of a sensor at the time it generates its output. For example, the temperature of the transducer 12 in the method 10 at the time of the well test may not be accurately known. For this reason, it is common practice to include a temperature sensor along with a pressure sensor in a transducer used in well tests such as those described above for the method 10. In that case, the output of the temperature sensor must also be accurately calibrated, so that the output of the pressure sensor may be accurately compensated for temperature applied to the pressure sensor.

Figure 4:
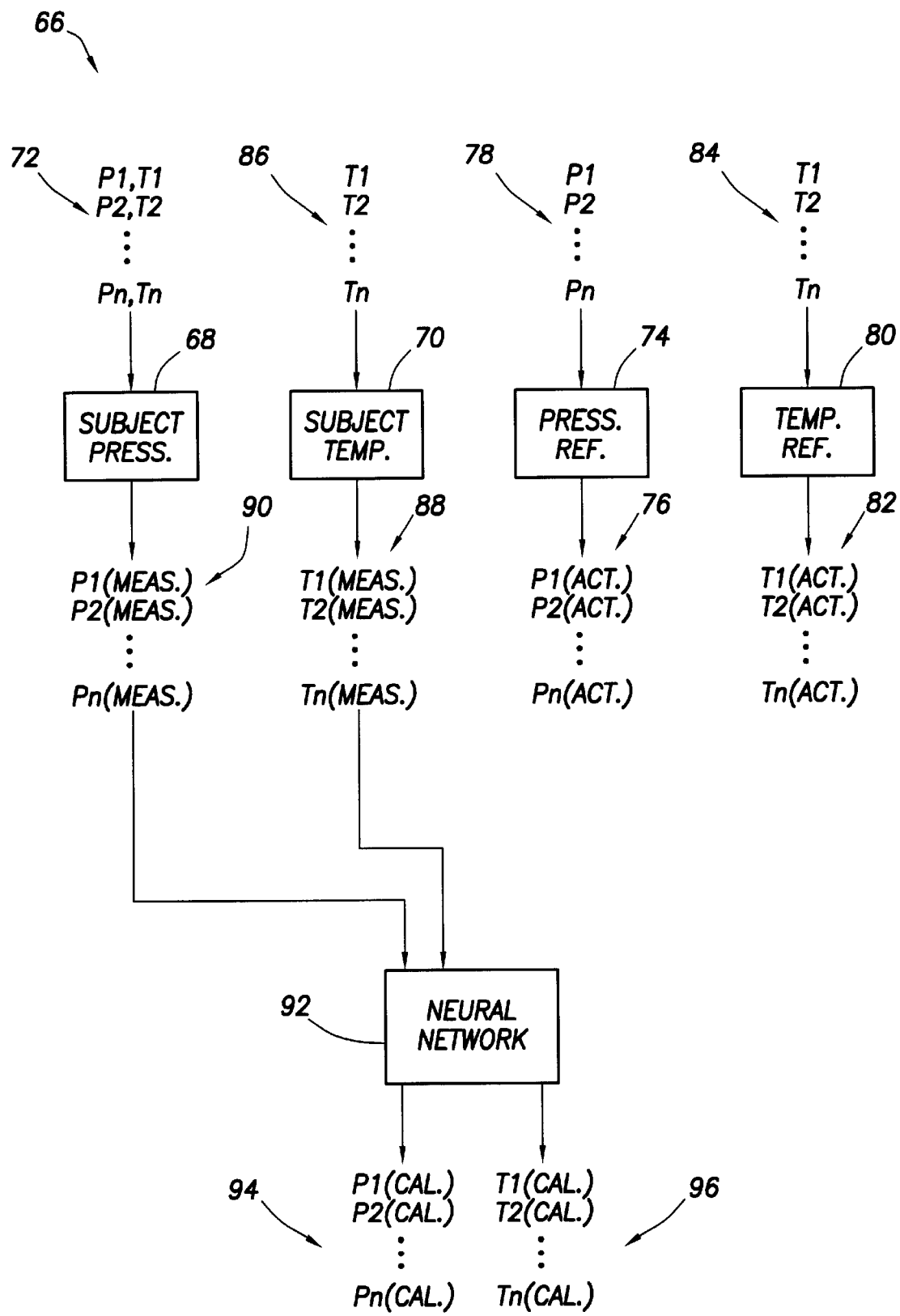
FIG. 4 is a schematic flow chart of a third method of calibrating sensors, the method embodying principles of the present invention.

Referring additionally now to FIG. 4, another method 66 of calibrating a sensor 68 is schematically and representatively illustrated in flow chart form. The subject sensor 68 may be incorporated into the transducer 12 of the method 10, or it may be utilized in other methods, other transducers, other applications, etc., without departing from the principles of the present invention. Additionally, the subject sensor 68 is described herein as being a pressure sensor, i.e., a sensor which produces an output indicative of pressure applied thereto. However, it is to be clearly understood that the subject sensor 68 may be any type of sensor and may produce an output indicative of stimuli other than pressure in keeping with the principles of the present invention.

The method 66 also accomplishes calibration of a second subject sensor 70 which may also be incorporated into the transducer 12 of the method 10, or which may be utilized in other methods, other transducers, other applications, etc. The sensor 70 is described herein as being a temperature sensor, i.e., a sensor which produces an output indicative of temperature applied thereto. However, it is to be clearly understood that the subject sensor 70 may be any type of sensor and may produce an output indicative of stimuli other than temperature in keeping with the principles of the present invention.

The subject temperature sensor 70 is used in the method 66 to demonstrate how the method may be utilized to advantage in those situations in which the subject pressure sensor 68 produces an output which is influenced by temperature applied to the subject pressure sensor. Preferably, in these situations, the subject temperature sensor 70 is positioned in close proximity to the subject pressure sensor 68, for example, by including both the temperature sensor and the pressure sensor in a single transducer, such as the transducer 12 in the method 10, so that the same temperature applied to the pressure sensor is also applied to the temperature sensor. However, it is to be clearly understood that it is not necessary, in keeping with the principles of the present invention, for the subject sensors 68, 70 to be in close proximity to each other, for the subject sensors to be included in the same transducer, or for the subject sensors to be pressure and temperature sensors.

As with the pressure sensor 44 described above, the subject pressure sensor 68 generates an output which is indicative of pressure applied thereto, but this output is also influenced, at least in part, by temperature applied to the sensor. This is often the case with sensors which include quartz piezoelectric crystals, and which are frequently used in downhole applications, such as in the types of well tests described above.

In the method 66, an input 72 to the subject pressure sensor 68 includes both pressures and temperatures. Thus, for each pressure (P1, P2, ..., Pn) applied to the subject pressure sensor 68, a corresponding respective temperature (T1, T2, ..., Tn) is also applied to the sensor. Preferably, but not necessarily, the pressures and temperatures in the input 72 span or cover the range of pressures and temperatures over which the subject pressure sensor 68 is designed to operate in actual practice.

A known accurate reference pressure sensor 74 which generates an output 76 having a known mathematical relationship to an input 78 thereto including the same pressures (P1, P2, ..., Pn) applied to the subject pressure sensor 68 may be used in the method 66 in the same manner as the reference sensor 30 is used in the method 26 described above. Similarly, a known accurate reference temperature sensor 80 may be used in the method 66 to generate an output 82 in response to an input 84 including the same temperatures (T1, T2, ..., Tn) applied to the subject pressure sensor 68, with the output having a known mathematical relationship to the input. However, as described above for the reference sensor 30, if the pressures and/or temperatures in the input 72 applied to the subject sensor 68 may be otherwise known, then the pressure and/or temperature reference sensors 74, 80 are unnecessary and the pressure input 78 and temperature input 84 may be substituted for the reference sensor outputs 76, 82, respectively, in the further description of the method 66 below.

The same temperatures (T1, T2, ..., Tn) applied to the subject pressure sensor 68 in the input 72 and applied to the temperature reference sensor 80 in the input 84 are also applied as input 86 to the subject temperature sensor 70. In response, the subject temperature sensor 70 produces an output 88 which is indicative of the temperatures applied to both of the subject sensors 68, 70. The subject pressure sensor 68 produces an output 90 which is indicative of the pressures applied thereto, but which is also influenced by the temperatures applied to the subject sensors 68, 70.

The subject sensor outputs 88, 90 are input to a neural network 92 in order to train the neural network. The neural network 92 may be, but is not necessarily, of the same type as the neural network 38 described above, except that the neural network 92 is a two input, two output type of neural network. The neural network 92 is trained until a pressure indicative output 94 thereof compares with sufficient accuracy to the pressure reference sensor output 76, and a temperature indicative output 96 thereof compares with sufficient accuracy to the temperature reference sensor output 82. In this manner, the neural network 92, once trained, generates the calibrated outputs 94, 96 in response to input thereto of the output 90 of the subject pressure sensor 68 and the output 88 of the subject temperature sensor 70, in that the neural network pressure output 94 simulates the output 76 of the pressure reference sensor 74 and the neural network temperature output 96 simulates the output 82 of the temperature reference sensor 80.

In actual practice, output of the subject pressure sensor 68 and output of the subject temperature sensor 70 are both input to the neural network 92. The neural network 92 then generates a calibrated pressure indicative output which compensates for the temperature of the subject pressure sensor 68 at the time its output was generated, and also generates a calibrated temperature indicative output. The subject sensors 68, 70 and/or the neural network 92 may be included in the transducer 12 or they may be separately positioned, the neural network 92 may take any form, and the subject sensors and neural network may be directly connected or remotely communicated, as described above for the method 26.

It will be readily appreciated that the method 66 permits accurate calibration of multiple sensors, even though one sensor output may vary in response to a stimulus indicated by the other sensor, which stimulus is other than that stimulus for which the first sensor output is primarily designed to indicate or represent. The neural network has input thereto not only the first sensor output, but also the second sensor output, and in response generates calibrated outputs of both sensors. For example, if the subject pressure sensor 68 and the subject temperature sensor 70 are included in the transducer 12 in the method 10 described above, the temperature of the pressure sensor at the time it generates its output, as indicated by the temperature sensor, is used by the neural network 92 to generate a calibrated pressure output which compensates for that temperature, and to generate a calibrated temperature output. Of course, the neural network 92 may only generate one of the outputs, if desired, without departing from the principles of the present invention.

Unfortunately, in some cases, a temperature sensor is also exposed to pressures applied to a pressure sensor, and the output of the temperature sensor is influenced by those pressures. This is frequently the case where a quartz piezoelectric crystal is included in the temperature sensor. In these situations, the temperature sensor output may be compensated for the pressures applied thereto in a similar manner to that in which the pressure sensor output is compensated for the temperatures applied thereto.

Figure 5:
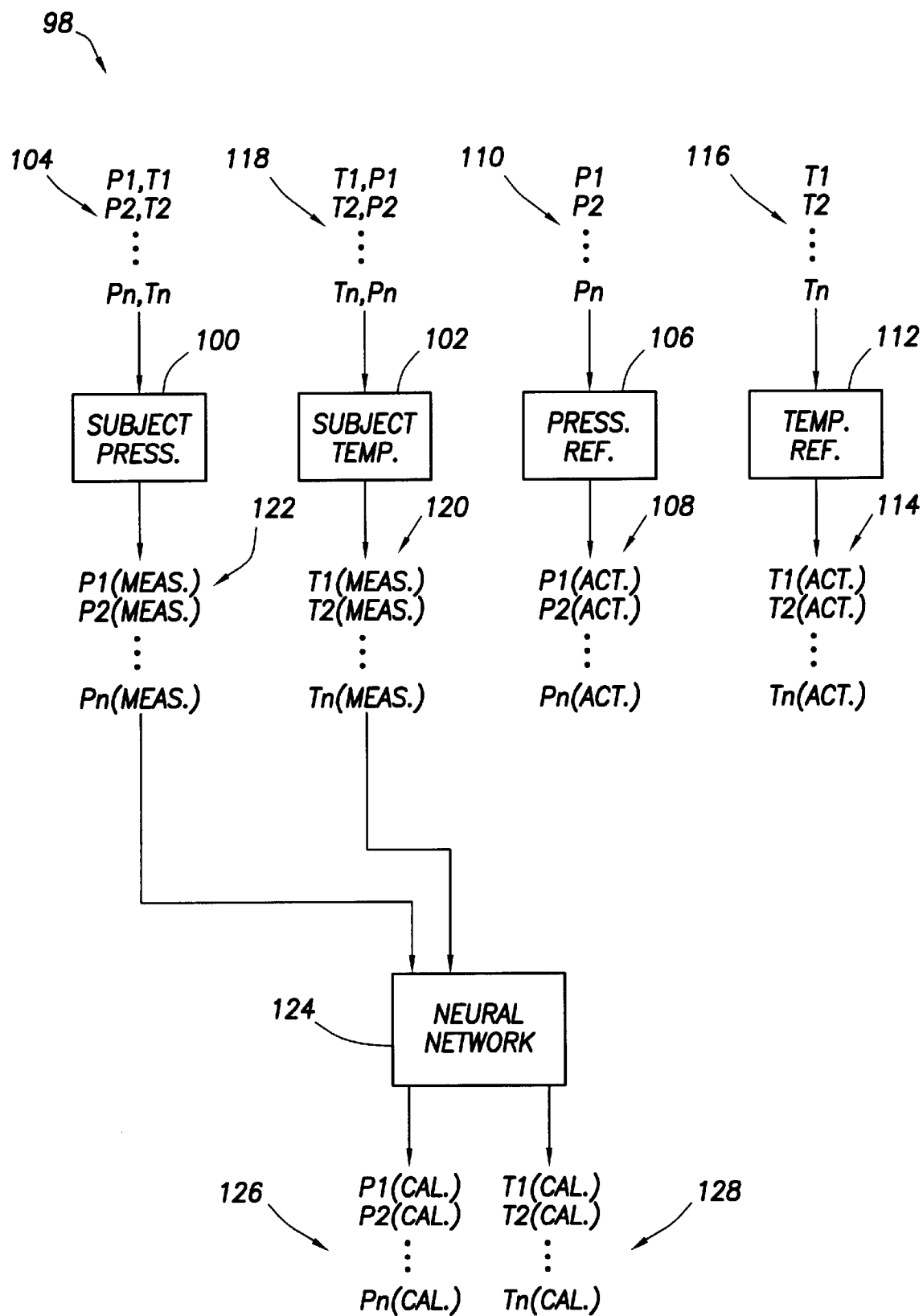
FIG. 5 is a schematic flow chart of a fourth method of calibrating sensors, the method embodying principles of the present invention.

Referring additionally now to FIG. 5, another method 98 of calibrating a sensor 100 is schematically and representatively illustrated in flow chart form. The subject sensor 100 may be incorporated into the transducer 12 of the method 10, or it may be utilized in other.methods, other transducers, other applications, etc., without departing from the principles of the present invention. Additionally, the subject sensor 100 is described herein as being a pressure sensor, i.e., a sensor which produces an output indicative of pressure applied thereto. However, it is to be clearly understood that the subject sensor 100 may be any type of sensor and may produce an output indicative of stimuli other than pressure in keeping with the principles of the present invention.

The method 98 also accomplishes calibration of a second sensor 102 which may also be incorporated into the transducer 12 of the method 10, or which may be utilized in other methods, other transducers, other applications, etc. The sensor 102 is described herein as being a temperature sensor, i.e., a sensor which produces an output indicative of temperature applied thereto. However, it is to be clearly understood that the subject sensor 102 may be any type of sensor and may produce an output indicative of stimuli other than temperature in keeping with the principles of the present invention.

The subject temperature sensor 102 is used in the method 98 to demonstrate how the method may be utilized to advantage in those situations in which the subject pressure sensor 100 produces an output which is influenced by temperature applied to the subject pressure sensor, and in which the subject temperature sensor produces an output which is influenced by pressure applied to the subject temperature sensor. Preferably, in these situations, the subject temperature sensor 102 is positioned in close proximity to the subject pressure sensor 100, for example, by including both the temperature sensor and the pressure sensor in a single transducer, such as the transducer 12 in the method 10, so that the same temperature and pressure applied to the pressure sensor are also applied to the temperature sensor. However, it is to be clearly understood that it is not necessary, in keeping with the principles of the present invention, for the subject sensors 100, 102 to be in close proximity to each other, for the subject sensors to be included in the same transducer, or for the subject sensors to be pressure and temperature sensors.

As with the pressure sensor 44 described above, the subject pressure sensor 100 generates an output which is indicative of pressure applied thereto, but this output is also influenced, at least in part, by temperature applied to the sensor. Conversely, the subject temperature sensor 102 generates an output which is indicative of temperature applied thereto, but this output is also influenced, at least in part, by pressure applied to the sensor. This is often the case with sensors which include quartz piezoelectric crystals, and which are frequently used in downhole applications, such as in the types of well tests described above.

In the method 98, an input 104 to the subject pressure sensor 100 includes both pressures and temperatures. Thus, for each pressure (P1, P2, . . . , Pn) applied to the subject pressure sensor 100, a corresponding respective temperature (T1, T2, . . . , Tn) is also applied to the sensor. Preferably, but not necessarily, the pressures and temperatures in the input 104 span or cover the range of pressures and temperatures over which the subject pressure sensor 100 is designed to operate in actual practice.

A known accurate reference pressure sensor 106 which generates an output 108 having a known mathematical relationship to an input 110 thereto including the same pressures (P1, P2, . . . , Pn) applied to the subject pressure sensor 100 may be used in the method 98 in the same manner as the reference sensor 30 is used in the method 26 described above. Similarly, a known accurate reference temperature sensor 112 may be used in the method 98 to generate an output 114 in response to an input 116 including the same temperatures (T1, T2, . . . , Tn) applied to the subject pressure sensor 100, with the output having a known mathematical relationship to the input. However, as described above for the reference sensor 30, if the pressures and/or temperatures in the input 104 applied to the subject sensor 100 may be otherwise known, then the pressure and/or temperature reference sensors 106, 112 are unnecessary and the pressure input 110 and temperature input 116 may be substituted for the reference sensor outputs 108, 114, respectively, in the further description of the method 98 below.

The same temperatures (T1, T2, . . . , Tn) and pressures (P1, P2, . . . , Pn) applied to the subject pressure sensor 100 in the input 104 and applied to the reference sensors 106, 112 in the inputs 110, 116 are also applied as input 118 to the subject temperature sensor 102. Thus, the input 118 is the same as input 104. In response, the subject temperature sensor 102 produces an output 120 which is indicative of the temperatures applied to both of the subject sensors 100, 102, but which is also influenced by the pressures applied to the subject sensors. The subject pressure sensor 100 produces an output 122 which is indicative of the pressures applied thereto, but which is also influenced by the temperatures applied to the subject sensors 100, 102.

The subject sensor outputs 120,122 are input to a neural network 124 in order to train the neural network. The neural network 124 may be, but is not necessarily, of the same type as the neural network 38 described above, except that the neural network 124 is a two input, two output type of neural network. The neural network 124 is trained until a pressure indicative output 126 thereof compares with sufficient accuracy to the pressure reference sensor output 108, and a temperature indicative output 128 thereof compares with sufficient accuracy to the temperature reference sensor output 114. In this manner, the neural network 124, once trained, generates the calibrated outputs 126, 128 in response to input thereto of the output 122 of the subject pressure sensor 100 and the output 120 of the subject temperature sensor 102, in that the neural network pressure output 126 simulates the output 108 of the pressure reference sensor 106 and the neural network temperature output 128 simulates the output 114 of the temperature reference sensor 112.

In actual practice, output of the subject pressure sensor 100 and output of the subject temperature sensor 102 are both input to the neural network 124. The neural network 124 then generates a calibrated pressure indicative output which compensates for the temperature of the subject pressure sensor 100 at the time its output was generated, and also generates a calibrated temperature indicative output which compensates for the pressure applied to the subject temperature sensor 102 at the time its output was generated. The subject sensors 100, 102 and/or the neural network 124 may be included in the transducer 12 or they may be separately positioned, the neural network 124 may take any form, and the subject sensors and neural network may be directly connected or remotely communicated, as described above for the method 26.

It will be readily appreciated that the method 98 permits accurate calibration of multiple sensors, even though each sensor output may vary in response to a stimulus indicated by another sensor, which stimulus is other than that stimulus for which each sensor output is primarily designed to indicate or represent. The neural network has input thereto not only the first sensor output, but also the second sensor output, and in response generates calibrated outputs of both sensors. For example, if the subject pressure sensor 100 and the subject temperature sensor 102 are included in the transducer 12 in the method 10 described above, the temperature of the pressure sensor at the time it generates its output, as indicated by the temperature sensor, is used by the neural network 124 to generate a calibrated pressure output which compensates for that temperature, and the pressure applied to the temperature sensor at the time it generates its output, as indicated by the pressure sensor, is used by the neural network 124 to generate a calibrated temperature output which compensates for that pressure. Note that the neural network 124 may only generate one of the outputs, without departing from the principles of the present invention.

Unfortunately, in some cases, the output of a pressure sensor is not only influenced by the temperature of the sensor at the time its output is generated, but is also influenced by changes in its temperature. This is frequently the case where a quartz piezoelectric crystal is included in the pressure sensor. The pressure sensor output may also, or alternatively, be influenced by other factors, such as by changes in the pressure applied to the sensor. In these situations, the pressure sensor output would desirably be compensated for changes in the stimulus applied thereto. These stimulus changes may be a first order, or higher order, derivative or integral of the level of the stimulus over the time the stimulus is applied to the sensor.

Figure 6:
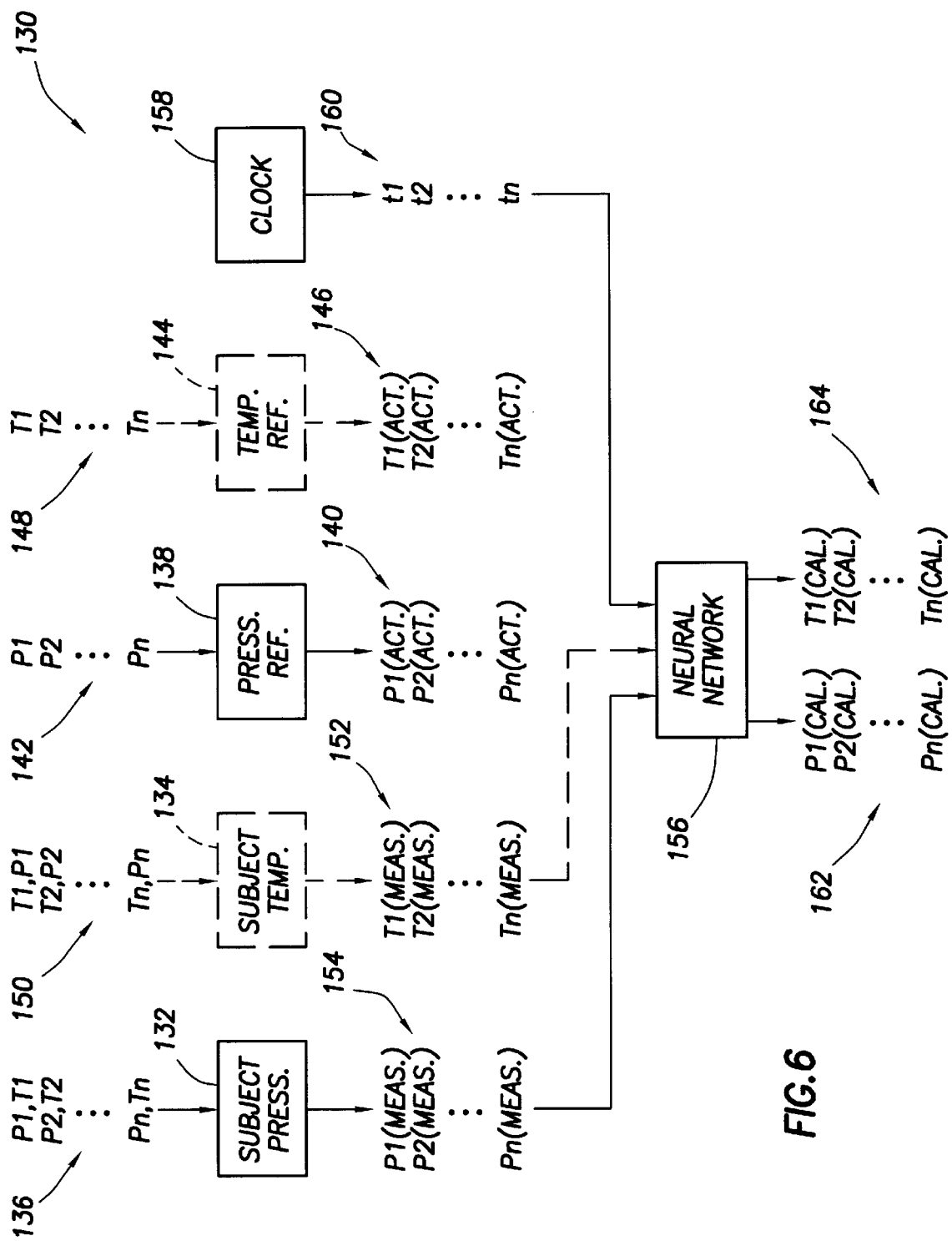
FIG. 6 is a schematic flow chart of a fifth method of calibrating sensors, the method embodying principles of the present invention.

Referring additionally now to FIG. 6, another method 130 of calibrating a sensor 132 is schematically and representatively illustrated in flow chart form. The subject sensor 132 may be incorporated into the transducer 12 of the method 10, or it may be utilized in other methods, other transducers, other applications, etc., without departing from the principles of the present invention. Additionally, the subject sensor 132 is described herein as being a pressure sensor, i.e., a sensor which produces an output indicative of pressure applied thereto. However, it is to be clearly understood that the subject sensor 132 may be any type of sensor and may produce an output indicative of stimuli other than pressure in keeping with the principles of the present invention.

The method 130 may also accomplish calibration of a second sensor 134 which may also be incorporated into the transducer 12 of the method 10, or which may be utilized in other methods, other transducers, other applications, etc. The subject temperature sensor 134 is shown in dashed lines in FIG. 6 to indicate that it may or may not be included in the method 130. For example, where the output of the subject pressure sensor 132 is influenced by its temperature and changes in that temperature, and those temperatures and changes in temperature may be known without the use of a temperature sensor, then use of the subject temperature sensor 134 is unnecessary. However, preferably a temperature sensor positioned in close proximity to the subject pressure sensor 132 is utilized in order to provide indications of the actual temperatures and changes in temperature experienced by the pressure sensor.

The sensor 134 is described herein as being a temperature sensor, i.e., a sensor which produces an output indicative of temperature applied thereto. However, it is to be clearly understood that the subject sensor 134 may be any type of sensor and may produce an output indicative of stimuli other than temperature in keeping with the principles of the present invention.

The subject temperature sensor 134 is used in the method 130 to demonstrate how the method may be utilized to advantage in those situations in which the subject pressure sensor 132 produces an output which is influenced by temperatures and changes in temperature applied to the subject pressure sensor. Note that the subject temperature sensor 134 may produce an output which is influenced by pressures and changes in pressure applied to the subject temperature sensor. Preferably, in these situations, the subject temperature sensor 134 is positioned in close proximity to the subject pressure sensor 132, for example, by including both the temperature sensor and the pressure sensor in a single transducer, such as the transducer 12 in the method 10, so that the same temperatures and pressures applied to the pressure sensor are also applied to the temperature sensor. However, it is to be clearly understood that it is not necessary, in keeping with the principles of the present invention, for the subject sensors 132, 134 to be in close proximity to each other, for the subject sensors to be included in the same transducer, or for the subject sensors to be pressure and temperature sensors.

As with the pressure sensor 44 described above, the subject pressure sensor 132 generates an output which is indicative of pressure applied thereto, but this output may also be influenced, at least in part, by temperature applied to the sensor, by changes in temperature applied to the sensor, or by changes in the pressure applied to the sensor. Conversely, the subject temperature sensor 134 generates an output which is indicative of temperature applied thereto, but this output may also be influenced, at least in part, by pressure applied to the sensor, by changes in pressure applied to the sensor, or by changes in temperature applied to the sensor. This may be the case with sensors which include quartz piezoelectric crystals, and which are frequently used in downhole applications, such as in the types of well tests described above.

In the method 130, an input 136 to the subject pressure sensor 132 may include both pressures and temperatures applied over time. Thus, for each pressure (P1, P2, . . . , Pn) applied to the subject pressure sensor 132, a corresponding respective temperature (T1, T2, . . . , Tn) may also be applied to the sensor. Preferably, but not necessarily, the pressures and temperatures in the input 136 span or cover the range of pressures and temperatures over which the subject pressure sensor 132 is designed to operate in actual practice.

A known accurate reference pressure sensor 138 which generates an output 140 having a known mathematical relationship to an input 142 thereto including the same pressures (P1, P2, ..., Pn) applied to the subject pressure sensor 132 may be used in the method 130 in the same manner as the reference sensor 30 is used in the method 26 described above. Similarly, a known accurate reference temperature sensor 144 may be used in the method 130 to generate an output 146 in response to an input 148 including the same temperatures (T1, T2, ..., Tn) applied to the subject pressure sensor 132, with the output having a known mathematical relationship to the input. However, as described above for the reference sensor 30, if the pressures and/or temperatures in the input 136 applied to the subject sensor 132 may be otherwise known, then the pressure and/or temperature reference sensors 138, 144 are unnecessary and the pressure input 142 and temperature input 148 may be substituted for the reference sensor outputs 140, 146, respectively, in the further description of the method 130 below.

The same temperatures (T1, T2, ..., Tn) and pressures (P1, P2, ..., Pn) applied to the subject pressure sensor 132 in the input 136 and applied to the reference sensors 138, 144 in the inputs 142, 148 are also applied as input 150 to the subject temperature sensor 134. Thus, the input 150 is the same as input 136 for those cases where the subject temperature sensor 134 is used and the subject temperature sensor has an output which is influenced by pressure applied thereto. Of course, if the subject pressure sensor 132 output is unaffected by temperature and/or changes in temperature, then there is no need for its input to include the temperatures (T1, T2, ..., Tn) and there is no need for the subject temperature sensor 134 to be included in the method 130. If the subject temperature sensor 134 is used in the method 130, but its output is unaffected by pressures and/or changes in pressure applied thereto, then there is no need for its input to include the pressures (P1, P2, ..., Pn).

In response to the input 150, the subject temperature sensor 134 produces an output 152 which is indicative of the temperatures applied to both of the subject sensors 132, 134, but which may also be influenced by the pressures and/or changes in pressure and/or temperature applied to the subject sensors. The subject pressure sensor 132 produces an output 154 which is indicative of the pressures applied thereto, but which may also be influenced by the temperatures and/or changes in temperature and/or pressure applied to the subject sensors 132, 134.

A clock 158 is provided in the method 130, so that the relative time at which each of the pressures (P1, P2, ..., Pn) and/or temperatures (T1, T2, ..., Tn) is/are applied to the subject pressure and/or temperature sensors 132, 134 may be determined. The clock 158 produces an output 160 indicative of the time at which corresponding respective pressures and/or temperatures are applied in the inputs 136, 150.

The subject sensor outputs 152, 154 and clock output 160 are input to a neural network 156 in order to train the neural network. The neural network 156 may be, but is not necessarily, of the same type as the neural network 38 described above, except that the neural network 156 may be either a two input, one output type of neural network, or a three input, two output type of neural network, depending upon whether data indicative of multiple stimuli is desired to be input to the neural network. The neural network 156 is trained until a pressure indicative output 162 thereof compares with sufficient accuracy to the pressure reference sensor output 140, and a temperature indicative output 164 thereof, if desired, compares with sufficient accuracy to the temperature reference sensor output 146. In this manner, the neural network 156, once trained, generates the calibrated outputs 162 and/or 164 in response to input thereto of the clock output 160 and the output 154 of the subject pressure sensor 132 and/or the output 152 of the subject temperature sensor 134, in that the neural network pressure output 162 simulates the output 140 of the pressure reference sensor 138 and the neural network temperature output 164, if generated, simulates the output 146 of the temperature reference sensor 144.

In actual practice, output of the subject pressure sensor 132 and output of the subject temperature sensor 134, if used, are input to the neural network 156, along with the clock output 160. The neural network 156 may then generate a calibrated pressure indicative output which compensates for the temperature and changes in temperature of the subject pressure sensor 132 and/or changes in pressure at the time its output was generated, and may also generate a calibrated temperature indicative output which compensates for the pressure and/or changes in pressure applied to the subject temperature sensor 134 and/or changes in temperature at the time its output was generated. The subject sensors 132, 134, clock 158 and/or the neural network 156 may be included in the transducer 12 or they may be separately positioned, the neural network 156 may take any form, and the subject sensors and neural network may be directly connected or remotely communicated, as described above for the method 26.

Note that, the clock 158 output may also be affected by stimulus applied thereto. For example, if the clock 158 is included in the transducer 12 in the method 10, it may also be subjected to temperatures the same as, or similar to, those experienced by one or more sensors in the transducer. If desired, the principles of the present invention may be utilized to compensate for such stimulus and/or changes in stimulus applied to the clock 158 in a manner similar to that described above for compensating for stimulus and/or changes in stimulus applied to sensors. For example, a reference clock (not shown in FIG. 6) may be used in the method 130 to generate an output indicative of actual relative time, while the clock 158 is subjected to the temperature input 148. Of course, in actual practice it is not necessary for the clock 158 to be subjected to any stimulus also experienced by sensors, since the clock could be at the earth's surface or otherwise remotely located with respect to the sensors, or the clock may be otherwise isolated from one or more stimuli experienced by the sensors.

It will be readily appreciated that the method 130 permits accurate calibration of one or more sensors, even though a sensor output may vary in response to a stimulus or change in stimulus indicated by the sensor, or by a stimulus or change in stimulus indicated by another sensor. The neural network 156 has input thereto not only the one or more sensor output(s), but also relative times at which the output(s) were generated, and in response generates calibrated output(s) of the sensor(s). For example, if the subject pressure sensor 132 and the subject temperature sensor 134 are included in the transducer 12 in the method 10 described above, the temperature of the pressure sensor and the change in temperature at the time it generates its output, as indicated by the temperature sensor and the clock, are used by the neural network 156 to generate a calibrated pressure output which compensates for that temperature and change in temperature, and the pressure applied to the temperature sensor and the change in pressure at the time it generates its output, as indicated by the pressure sensor and the clock, are used by the neural network 156 to generate a calibrated temperature output which compensates for that pressure and change in pressure. Note that the neural network 156 may only generate one of the outputs, without departing from the principles of the present invention.

Figure 7:
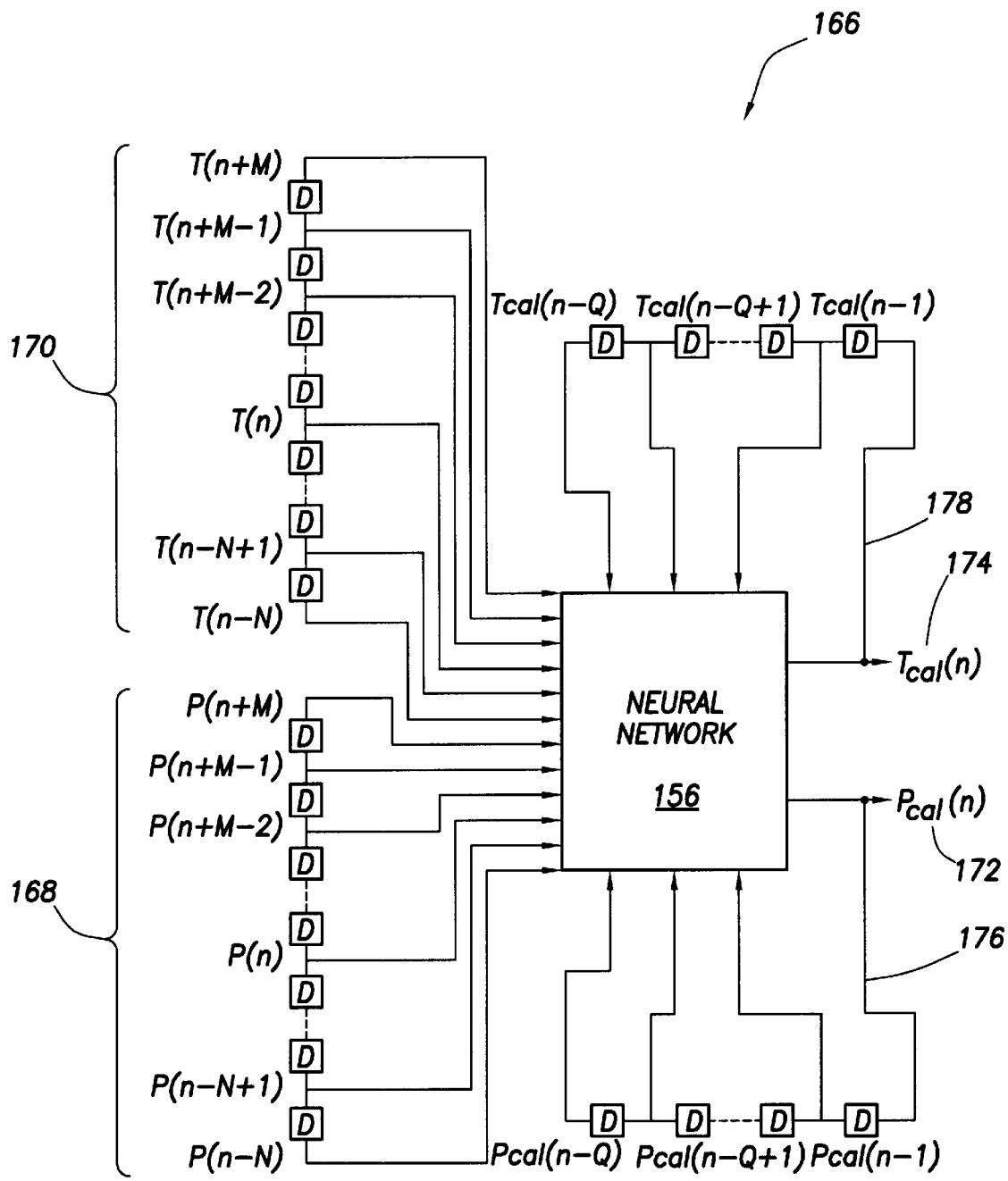
FIG. 7 is a schematic flow chart of a sixth method of calibrating sensors, the method embodying principles of the present invention.

Referring additionally now to FIG. 7, a method 166 of generating change-compensated calibrated outputs of one or more sensors is representatively and schematically illustrated in flow chart form. In the following description of the method 166, the neural network 156 and uncalibrated outputs 152, 154 of the subject temperature and pressure sensors 134, 132 described above are used as an example of a situation in which the method 166 may be utilized advantageously. However, it is to be clearly understood that the method 166 may be used with other types of data input, other numbers of sensor outputs, other types of sensor outputs, other inputs, other neural networks, etc., without departing from the principles of the present invention. Thus, the method 166 is not to be considered as limited to the specific embodiment thereof described herein.

In the method 166, the pressure sensor output 154, temperature sensor output 152 and clock output 160 are input to the neural network 156. For clarity of description, pressure sensor data 168 input to the neural network 156, which data includes the pressure sensor output 154, is represented in FIG. 7 as a series of pressure indications (P(n+M), ..., P(n), ..., P(n−N)) separated by time delays (D). Similarly, temperature sensor data 170 input to the neural network 156, which data includes the temperature sensor output 152, is represented in FIG. 7 as a series of temperature indications (T(n+M), ..., T(n), ..., T(n−N)) separated by time delays (D). It will be readily appreciated that the time delays (D) are derived from the clock output 160. Although the time delays (D) between each pair of pressure and temperature indications are shown in FIG. 7 as being equal, such is not necessary in the method 166.

The pressure indication and corresponding temperature indication input to the neural network 156, for which a current calibrated output of each from the neural network is desired, are designated as P(n) and T(n), respectively, in FIG. 7. The calibrated outputs 172, 174 of these which result from the method 166 are designated Pcal(n) and Tcal(n), respectively, in FIG. 7.

Note that the pressure input data 168 includes not only the pressure indication P(n), but also pressure indications prior to, and subsequent to, the pressure indication P(n). Similarly, the temperature input data 170 includes not only the temperature indication T(n), but also temperature indications prior to, and subsequent to, the temperature indication T(n). The pressure indications prior to P(n) are designated P(n−N), P(n−N+1), ..., with N representing the number of prior pressure indications input to the neural network, and the pressure indications subsequent to P(n) are designated P(n+M), P(n+M−1), ..., with M representing the number of subsequent pressure indications input to the neural network 156. Similarly, the temperature indications prior to T(n) are designated T(n−N), T(n−N+1), ..., with N representing the number of prior temperature indications input to the neural network, and the temperature indications subsequent to T(n) are designated T(n+M), T(n+M−1), ..., with M representing the number of subsequent temperature indications input to the neural network 156.

Note also that, although these pressure and temperature designations are depicted in FIG. 7 and described above as representing respective discrete pressure and temperature indications between corresponding pairs of the delays (D), it is to be clearly understood that these designations preferably represent averages of respective pressure and temperature indications over each corresponding time delay (D). Thus, P(n) may be an average of multiple pressure indications in the pressure sensor output 154, and T(n) may be an average of multiple temperature indications in the temperature sensor output 152.

The neural network 156 is trained to produce pressure and temperature indicative outputs in response to the pressure sensor data 168, and the temperature sensor data 170, until the outputs 172, 174 correspond with sufficient accuracy to the reference sensor outputs 140, 146. Thereafter, when sets of actual pressure and temperature data are input to the neural network 156, the neural network will output accurate calibrated pressure and temperature indications. This method 166 as described above, wherein prior and subsequent pressure and temperature indications are input to the neural network 156, results in significant "smoothing" of the pressure and temperature curves produced by the calibrated pressure and temperature outputs 172, 174 plotted over time.

In a further refinement of the method 166, additional inputs to the neural network 156 may include those produced by tapped delay lines 176, 178, using techniques well known to those skilled in the art. For example, the calibrated pressure output 172 may be tapped by the delay line 176, so that prior calibrated pressure outputs (designated in FIG. 7 as Pcal(n−Q), Pcal(n−Q+1), ..., Pcal(n−1), where Q represents the number of prior calibrated pressure outputs tapped) may be input back into the neural network 156. Similarly, the calibrated temperature output 174 may be tapped by the delay line 178, so that prior calibrated pressure outputs (designated in FIG. 7 as Tcal(n−Q), Tcal(n−Q+1), ..., Tcal(n−1)) may be input back into the neural network 156.

Figure 8:
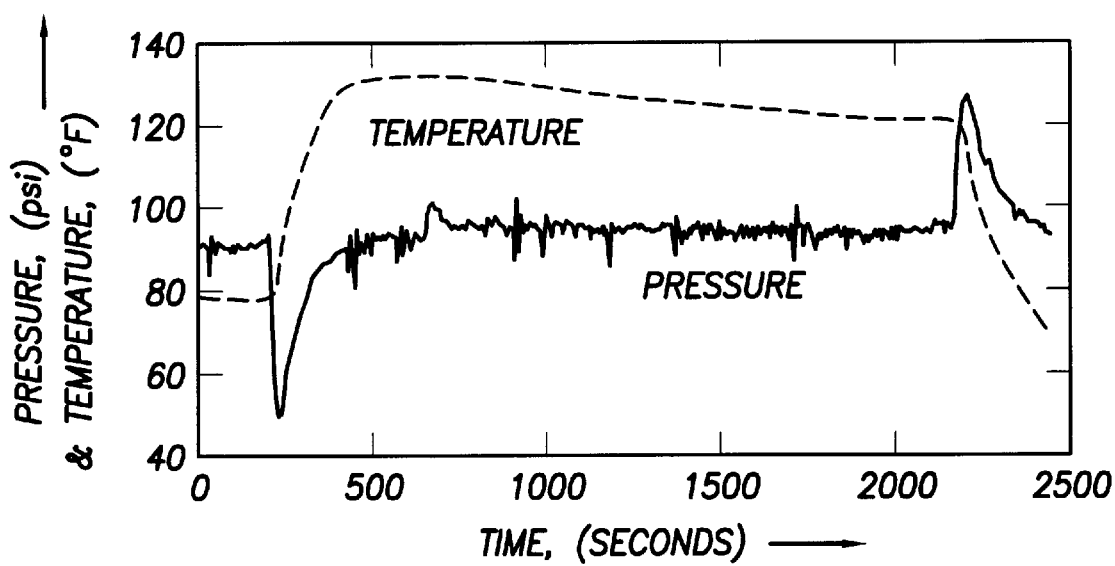
FIG. 8 is a representative chart of actual outputs of pressure and temperature sensors.
Figure 9:
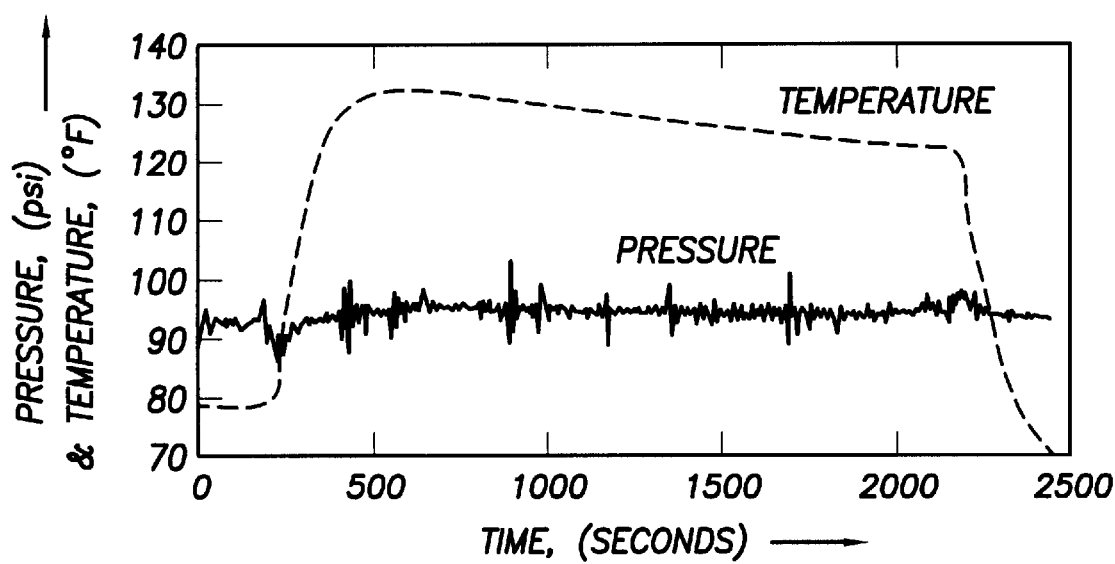
FIG. 9 is a representative chart of the pressure and temperature sensor outputs of FIG. 8 after using the calibration method of FIG. 7.

FIGS. 8 & 9 demonstrate the substantial increase in accuracy of sensor outputs which may be achieved using the methods described herein. FIG. 8 shows actual pressure and temperature outputs of respective pressure and temperature sensors. The pressure sensor was subjected to a relatively constant pressure of about 94 psi during the test represented in FIG. 8. However, the pressure sensor was of the type which has an output influenced by changes in temperature. Note that, at about 225 seconds into the test, an increase in temperature of about 50° F. in the environment surrounding the pressure sensor produced an indicated drop in pressure of about 45 psi, even though the pressure applied to the pressure sensor actually remained relatively constant. At about 2200 seconds into the test a decrease in temperature was seen to produce an indicated increase in pressure when, again, the actual pressure remained relatively constant.

In FIG. 9, the results of use of the methods described herein may be clearly seen. The same pressure and temperature data which produced the curves shown in FIG. 8 were input to a neural network as described above for the method 166, wherein 70 prior pressure and temperature indications (N=70) and 30 subsequent pressure and temperature indications (M=30) were used, along with a tapped delay line from the resulting output of each. Although the pressure curve shown in FIG. 9 does still include some minor indications of the thermal transients applied to the pressure sensor in this test, it will be readily appreciated that the present invention provides a substantial improvement over static calibration methods used in the past and, indeed, provides dynamic calibration. The calibration is dynamic in that changes in stimulus applied to a sensor, which changes influence the sensor output, may be compensated for by utilizing a neural network trained to recognize such changes and calibrate the sensor therefor.

Of course, upon a careful consideration of the specific embodiments of the present invention described above, a person skilled in the art will readily appreciate that certain modifications, substitutions, additions, deletions and other changes may be made to these embodiments without substantively deviating from the principles of the present invention, and these changes are, therefore, comprehended by the principles of the present invention. Accordingly, the foregoing detailed description is to be clearly understood as being given by way of illustration and example only, the spirit and scope of the present invention being limited solely by the appended claims.

What is claimed is:

1. A calibration method, the method comprising the steps of:

applying an input to a first subject sensor, the first subject sensor input including a series of levels of a first stimulus;

generating an output of the first subject sensor in response to the first subject sensor input, the first subject sensor output including a series of uncalibrated measurements of corresponding respective ones of the series of first stimulus levels;

inputting the first subject sensor output to a neural network;

training the neural network to generate a calibrated output of the first subject sensor; and generating an output of a clock device, the output including a series of individual time indications, and wherein the inputting step further comprises inputting the clock device output to the neural network, with ones of the series of individual time indications being identified with corresponding respective ones of the series of first stimulus levels.

2. A calibration method, the method comprising the steps of:

applying an input to a first subject sensor, the first subject sensor input including a series of levels of a first stimulus;

generating an output of the first subject sensor in response to the first subject sensor input, the first subject sensor output including a series of uncalibrated measurements of corresponding respective ones of the series of first stimulus levels;

inputting the first subject sensor output to a neural network; and training the neural network to generate a calibrated output of the first subject sensor, wherein in the first subject sensor output generating step, the uncalibrated measurements of the series of first stimulus levels are influenced at least in part by changes over time in the first subject sensor input, wherein in the inputting step, the changes over time in the first subject sensor input are input to the neural network by associating each one of the series of uncalibrated measurements of the series of first stimulus levels with a corresponding respective one of a series of relative time measurements generated by a clock device.

3. The method according to claim 2, wherein in the training step, the neural network is trained to generate the calibrated output of the first subject sensor which compensates for the influence of the changes over time in the first subject sensor input on the series of uncalibrated measurements of the series of first stimulus levels.

4. A calibration method, the method comprising the steps of:

applying an input to a first subject sensor, the first subject sensor input including a series of levels of a first stimulus;

generating an output of the first subject sensor in response to the first subject sensor input, the first subject sensor output including a series of uncalibrated measurements of corresponding respective ones of the series of first stimulus levels;

inputting the first subject sensor output to a neural network; and training the neural network to generate a calibrated output of the first subject sensor, wherein in the first subject sensor output generating step, the uncalibrated measurements of the series of first stimulus levels are influenced at least in part by changes over time in a series of second stimulus levels, wherein in the inputting step, the changes over time in the series of second stimulus levels are input to the neural network by associating each one of the series of second stimulus levels with a corresponding respective one of a series of relative time measurements generated by a clock device.

5. The method according to claim 4, wherein in the training step, the neural network is trained to generate the calibrated output of the first subject sensor which compensates for the influence of the changes over time in the series of second stimulus levels on the uncalibrated measurements of the series of first stimulus levels.

6. A calibration method, the method comprising the steps of:

applying an input to a first subject sensor, the first subject sensor input including a series of levels of a first stimulus;

generating an output of the first subject sensor in response to the first subject sensor input, the first subject sensor output including a series of uncalibrated measurements of corresponding respective ones of the series of first stimulus levels;

inputting the first subject sensor output to a neural network;

training the neural network to generate a calibrated output of the first subject sensor, wherein in the first subject sensor output generating step, the uncalibrated measurements of the series of first stimulus levels are influenced at least in part by changes over time in a series of second stimulus levels;

applying an input to a second subject sensor, the second subject sensor input including the series of second stimulus levels; and generating an output of the second subject sensor in response to the second subject sensor input, the second subject sensor output including a series of uncalibrated measurements of corresponding respective ones of the series of second stimulus levels, wherein the inputting step further comprises inputting the second subject sensor output to the neural network, and wherein in the second subject sensor output generating step, the series of uncalibrated measurements of the series of second stimulus levels is influenced at least in part by changes over time in the series of first stimulus levels.

7. The method according to claim 6, wherein in the inputting step, the changes over time in the series of first stimulus levels are input to the neural network by associating each one of the series of first stimulus levels with a corresponding respective one of a series of relative time measurements generated by a clock device.

8. The method according to claim 7, wherein in the training step, the neural network is trained to generate the calibrated output of the second subject sensor which compensates for the influence of the changes over time in the series of first stimulus levels on the uncalibrated measurements of the series of second stimulus levels.

9. A calibration method, the method comprising the steps of:
applying an input to a first subject sensor, the first subject sensor input including a series of levels of a first stimulus;
generating an output of the first subject sensor in response to the first subject sensor input, the first subject sensor output including a series of uncalibrated measurements of corresponding respective ones of the series of first stimulus levels;
inputting the first subject sensor output to a neural network; and
training the neural network to generate a calibrated output of the first subject sensor,
wherein in the training step, the neural network generates a first output including a series of measurements indicative of corresponding respective ones of the series of first stimulus levels,
wherein in the training step, each of the series of measurements in the neural network first output is generated in response to input to the neural network of a selected predetermined quantity of the series of uncalibrated first stimulus level measurements in the first subject sensor output.

10. The method according to claim 9, wherein in the training step, the selected predetermined quantity of the series of uncalibrated first stimulus level measurements includes a predetermined quantity of the series of uncalibrated first stimulus level measurements generated prior to the uncalibrated first stimulus level measurement for which each of the series of measurements in the neural network first output is generated.

11. The method according to claim 9, wherein in the training step, the selected predetermined quantity of the series of uncalibrated first stimulus level measurements includes a first predetermined quantity of the series of uncalibrated first stimulus level measurements generated subsequent to the uncalibrated first stimulus level measurement for which each of the series of measurements in the neural network first output is generated.

12. The method according to claim 11, wherein in the training step, the selected predetermined quantity of the series of uncalibrated first stimulus level measurements further includes a second predetermined quantity of the series of uncalibrated first stimulus level measurements generated prior to the uncalibrated first stimulus level measurement for which each of the series of measurements in the neural network first output is generated.

13. A calibration method, the method comprising the steps of:
applying an input to a first subject sensor, the first subject sensor input including a series of levels of a first stimulus;
generating an output of the first subject sensor in response to the first subject sensor input, the first subject sensor output including a series of uncalibrated measurements of corresponding respective ones of the series of first stimulus levels;
inputting the first subject sensor output to a neural network; and
training the neural network to generate a calibrated output of the first subject sensor,
wherein in the training step, the neural network generates a first output including a series of measurements indicative of corresponding respective ones of the series of first stimulus levels,
wherein in the training step, a series of a selected predetermined quantity of the series of measurements in the neural network first output generated prior to corresponding respective ones of each of the series of measurements in the neural network first output is input to the neural network.

14. The method according to claim 13, wherein in the training step, the series of the selected predetermined quantity of the series of measurements in the neural network first output is input to the neural network via a tapped delay line.

15. A method of calibrating first and second sensors, the first sensor generating an output indicative of a first series of levels of a first stimulus applied to the first sensor and influenced by a change in a second series of levels of a second stimulus applied to the first and second sensors, and the second sensor generating an output indicative of the second series of levels of the second stimulus, the method comprising the steps of:
time indexing the first and second sensor outputs;
inputting the first and second sensor outputs to a neural network; and
training the neural network by generating a first output of the neural network corresponding to the first sensor output, utilizing a first tapped delay line to input a first portion of the neural network first output to the neural network, generating a second output of the neural network corresponding to the second sensor output, and utilizing a second tapped delay line to input a second portion of the neural network second output to the neural network.

16. The method according to claim 15, wherein the first sensor output includes a series of first uncalibrated measurements corresponding to respective ones of the first series of the levels of the first stimulus, and wherein in the training step, for each one of a series of first measurements included in the first neural network output corresponding to a respective one of the first series of uncalibrated measurements, a first predetermined quantity of the series of the first uncalibrated measurements prior to the respective one of the first series of uncalibrated measurements is input to the neural network.

17. The method according to claim 16, wherein in the training step, for each one of the series of first measurements included in the first neural network output corresponding to the respective one of the first series of uncalibrated measurements, a second predetermined quantity of the series of the first uncalibrated measurements subsequent to the respective one of the first series of uncalibrated measurements is input to the neural network.

18. The method according to claim 17, wherein the second sensor output includes a series of second uncalibrated measurements corresponding to respective ones of the second series of the levels of the second stimulus, and wherein in the training step, for each one of a series of measurements included in the second neural network output corresponding to a respective one of the second series of uncalibrated measurements, a third predetermined quantity of the series of the second uncalibrated measurements prior to the respective one of the second series of uncalibrated measurements is input to the neural network.

19. The method according to claim 18, wherein in the training step, for each one of the series of measurements included in the second neural network output corresponding to the respective one of the second series of uncalibrated measurements, a fourth predetermined quantity of the series of the second uncalibrated measurements prior to the respective one of the second series of uncalibrated measurements is input to the neural network.

20. A method of calibrating a first sensor operatively positionable in a subterranean well, the method comprising the steps of:
   applying a first sensor input to the first sensor, the first sensor input including multiple levels of a first stimulus;
   generating a first output of the first sensor in response to the first sensor input;
   inputting the first sensor first output to a neural network;
   training the neural network so that the neural network generates a first neural network output which is related to the first sensor input by a first known mathematical function;
   positioning the first sensor within the well;
   applying a second sensor input including multiple levels of the first stimulus to the first sensor within the well;
   generating a second output of the first sensor in response to the second sensor input;
   inputting the first sensor second output to the neural network; and
   generating a second output of the neural network which is related to the second sensor input by the first known mathematical function,
      the positioning step further comprising including the first sensor in a transducer installed in the well,
      wherein the positioning step further comprises including the neural network in the transducer.

21. The method according to claim 20, wherein the positioning step further comprises remotely positioning the neural network relative to the first sensor.

22. A method of calibrating a first sensor operatively positionable in a subterranean well, the method comprising the steps of:
   applying a first sensor input to the first sensor, the first sensor input including multiple levels of a first stimulus;
   generating a first output of the first sensor in response to the first sensor input;
   inputting the first sensor first output to a neural network;
   training the neural network so that the neural network generates a first neural network output which is related to the first sensor input by a first known mathematical function;
   applying a second sensor input to a second sensor, the second sensor input including multiple levels of a second stimulus; and
   generating a first output of the second sensor in response to the second sensor input,
      the second sensor input applying step further comprising applying the second sensor input to the first sensor along with the first sensor input, and wherein in the-first sensor first output generating step, the first sensor output is influenced at least in part by the second sensor input,
      wherein the training step further comprises training the neural network so that the first neural network output is compensated for the influence of the second sensor input on the first sensor first output.

23. A method of calibrating a first sensor operatively positionable in a subterranean well, the method comprising the steps of:
   applying a first sensor input to the first sensor, the first sensor input including multiple levels of a first stimulus;
   generating a first output of the first sensor in response to the first sensor input;
   inputting the first sensor first output to a neural network;
   training the neural network so that the neural network generates a first neural network output which is related to the first sensor input by a first known mathematical function;
   applying a second sensor input to a second sensor, the second sensor input including multiple levels of a second stimulus; and
   generating a first output of the second sensor in response to the second sensor input,
      the second sensor input applying step further comprising applying the second sensor input to the first sensor along with the first sensor input, and wherein in the first sensor first output generating step, the first sensor output is influenced at least in part by the second sensor input,
      wherein in the first sensor first output generating step, the first sensor first output is influenced at least in part by a change over time of the second sensor output.

24. The method according to claim 23, wherein the training step further comprises training the neural network so that the first neural network output is compensated for the influence of the change over time of the second sensor input on the first sensor first output.

25. The method according to claim 24, wherein the training step further comprises utilizing at least one tapped delay line to input portions of the first neural network output to the neural network.

26. Apparatus operative in conjunction with a subterranean well, the apparatus comprising:
   a first sensor generating an output indicative of a series of first stimulus levels applied to the first sensor, the first sensor output including a series of first uncalibrated measurements of corresponding respective ones of the series of first stimulus levels;
   a neural network generating an output in response to the first sensor output, the neural network output including a series of first calibrated measurements of corresponding respective ones-of the series of first stimulus levels; and
   a clock device, the clock device time indexing each of the series of first uncalibrated measurements in the first sensor output.

27. Apparatus operative in conjunction with a subterranean well, the apparatus comprising:
   a first sensor generating an output indicative of a series of first stimulus levels applied to the first sensor, the first sensor output including a series of first uncalibrated measurements of corresponding respective ones of the series of first stimulus levels; and a neural network generating an output in response to the first sensor output, the neural network output including a series of first calibrated measurements of corresponding respective ones of the series of first stimulus levels, wherein the neural network output is compensated for changes in the first sensor output over time.

28. Apparatus operative in conjunction with a subterranean well, the apparatus comprising:

a first sensor generating an output indicative of a series of first stimulus levels applied to the first sensor, the first sensor output including a series of first uncalibrated measurements of corresponding respective ones of the series of first stimulus levels; and a neural network generating an output in response to the first sensor output, the neural network output including a series of first calibrated measurements of corresponding respective ones of the series of first stimulus levels, wherein each first calibrated measurement in the neural network output is generated in response to the corresponding respective first uncalibrated measurement in the first sensor output and a first predetermined quantity of prior first uncalibrated measurements, and wherein each first calibrated measurement in the neural network is further generated in response to a second predetermined quantity of first uncalibrated measurements subsequent to the corresponding respective first uncalibrated measurement in the first sensor output.

29. Apparatus operative in conjunction with a subterranean well, the apparatus comprising:

a first sensor generating an output indicative of a series of first stimulus levels applied to the first sensor, the first sensor output including a series of first uncalibrated measurements of corresponding respective ones of the series of first stimulus levels; and a neural network generating an output in response to the first sensor output, the neural network output including a series of first calibrated measurements of corresponding respective ones of the series of first stimulus levels, wherein a portion of the neural network output is input to the neural network.

30. The apparatus according to claim 29, wherein the neural network output portion is input via a tapped delay line.

31. Apparatus operative in conjunction with a subterranean well, the apparatus comprising:

a first sensor generating an output indicative of a series of first stimulus levels applied to the first sensor, the first sensor output including a series of first uncalibrated measurements of corresponding respective ones of the series of first stimulus levels;

a neural network generating an output in response to the first sensor output, the neural network output including a series of first calibrated measurements of corresponding respective ones of the series of first stimulus levels;

a second sensor generating an output indicative Of a series of second stimulus levels applied to the second sensor, the second sensor output including a series of second measurements of corresponding respective ones of the series of second stimulus levels, wherein the first sensor output is influenced at least in part by the series of second stimulus levels, and wherein the neural network output is generated further in response to the second sensor output.

32. The apparatus according to claim 31, wherein the neural network output further includes a series of second calibrated measurements of corresponding respective ones of the series of second stimulus levels.

33. The apparatus according to claim 31, wherein the second measurements in the second sensor output are uncalibrated, and wherein the neural network output further includes a series of second calibrated measurements of corresponding respective ones of the series of second stimulus levels.

34. The apparatus according to claim 33, wherein the second sensor output is influenced at least in part by the series of first stimulus levels applied to the second sensor simultaneously with the series of second stimulus levels.

35. The apparatus according to claim 31, further comprising a clock device, the clock device time indexing each of the series of first uncalibrated measurements in the first sensor output and each of the series of second measurements in the second sensor output.

36. The apparatus according to claim 31, wherein the neural network output is compensated for changes in the second sensor output over time.

37. The apparatus according to claim 31, wherein each second calibrated measurement in the neural network output is generated in response to the corresponding respective second measurement in the second sensor output and a first predetermined quantity of prior second measurements.

38. The apparatus according to claim 31, wherein each second calibrated measurement in the neural network output is further generated in response to a second predetermined quantity of second measurements subsequent to the corresponding respective second measurement in the second sensor output.

39. The apparatus according to claim 31, wherein each second calibrated measurement in the neural network output is generated in response to the corresponding respective second measurement in the second sensor output and a predetermined quantity of subsequent second measurements.

40. The apparatus according to claim 31, wherein a portion of the neural network output is input to the neural network.

41. The apparatus according to claim 40, wherein the neural network output portion is input via a tapped delay line.

42. Apparatus operative in conjunction with a subterranean well, the apparatus comprising:

a first sensor generating an output indicative of a series of first stimulus levels applied to the first sensor, the first sensor output including a series of first uncalibrated measurements of corresponding respective ones of the series of first stimulus levels; and a neural network generating an output in response to the first sensor output, the neural network output including a series of first calibrated measurements of corresponding respective ones of the series of first stimulus levels, wherein the first sensor and neural network are interconnected in a transducer.

43. The apparatus according to claim 42, wherein the transducer is positioned within the well.

* * * * *